United States Patent
Hata

(10) Patent No.: US 6,614,533 B1
(45) Date of Patent: Sep. 2, 2003

(54) SPECTROSCOPIC IMAGE INPUT SYSTEM

(75) Inventor: Yoshiaki Hata, Ashiya (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/528,245

(22) Filed: Mar. 17, 2000

(30) Foreign Application Priority Data

Mar. 18, 1999 (JP) .......................... 11-072923
Feb. 4, 2000 (JP) ...................... 2000-032750

(51) Int. Cl.[7] .............. G01B 9/02; G01J 3/45
(52) U.S. Cl. ............. 356/454; 356/456; 250/559.07
(58) Field of Search ................. 356/454, 456, 356/FOR 108; 250/559.04, 559.05, 559.03, 559.06, 559.07, 559.08

(56) References Cited

U.S. PATENT DOCUMENTS 5,751,420 A 5/1998 Iida et al.
5,859,700 A * 1/1999 Yang .......................... 356/300

FOREIGN PATENT DOCUMENTS

JP  05196503  8/1993

* cited by examiner

Primary Examiner—Samuel A. Turner
Assistant Examiner—Patrick Connolly
(74) Attorney, Agent, or Firm—Burns, Doane, Swecker & Mathis, LLP

(57) ABSTRACT

A spectroscopic image input system has an image data capturing apparatus for capturing the image data of an object by using a two-dimensional image-sensing device, a spectrum data obtaining apparatus for obtaining the spectrum data of the object within a smaller area and with higher wavelength resolution than the image data capturing apparatus, and a determination section for determining a portion of the object in which to obtain the spectrum data on the basis of the image data captured. Thus, this spectroscopic image input system captures the image data and obtains the spectrum data automatically.

19 Claims, 5 Drawing Sheets

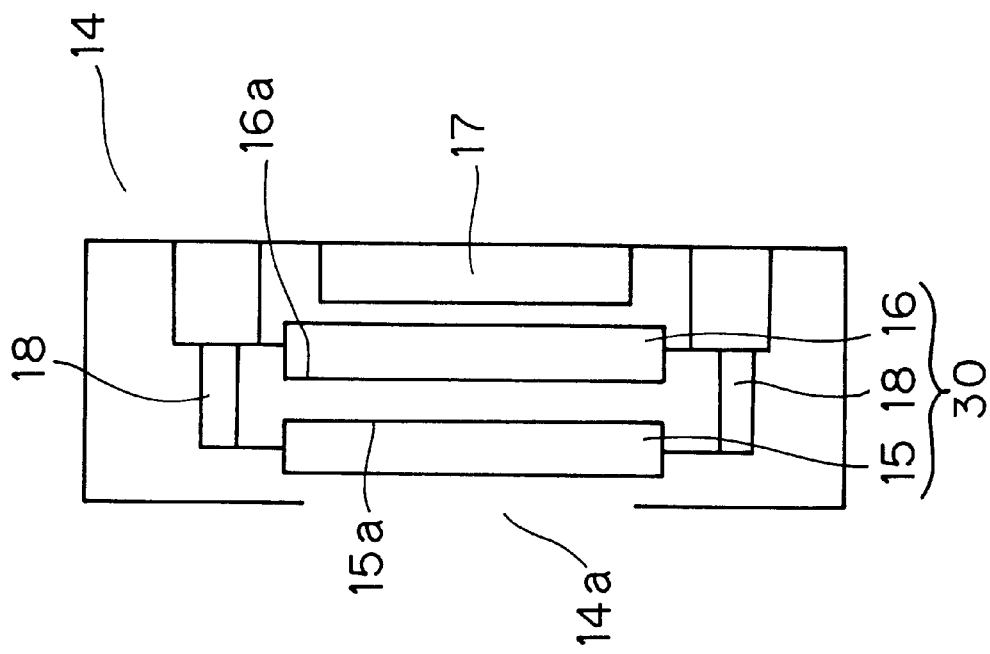
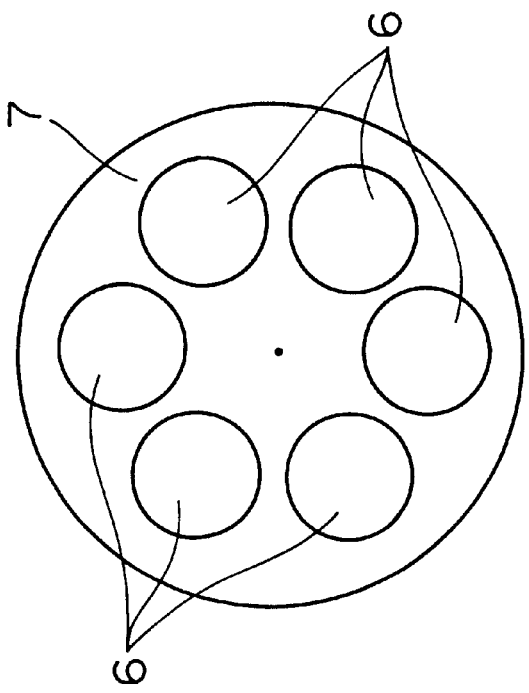
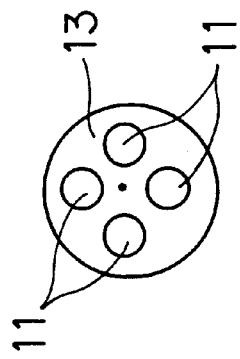

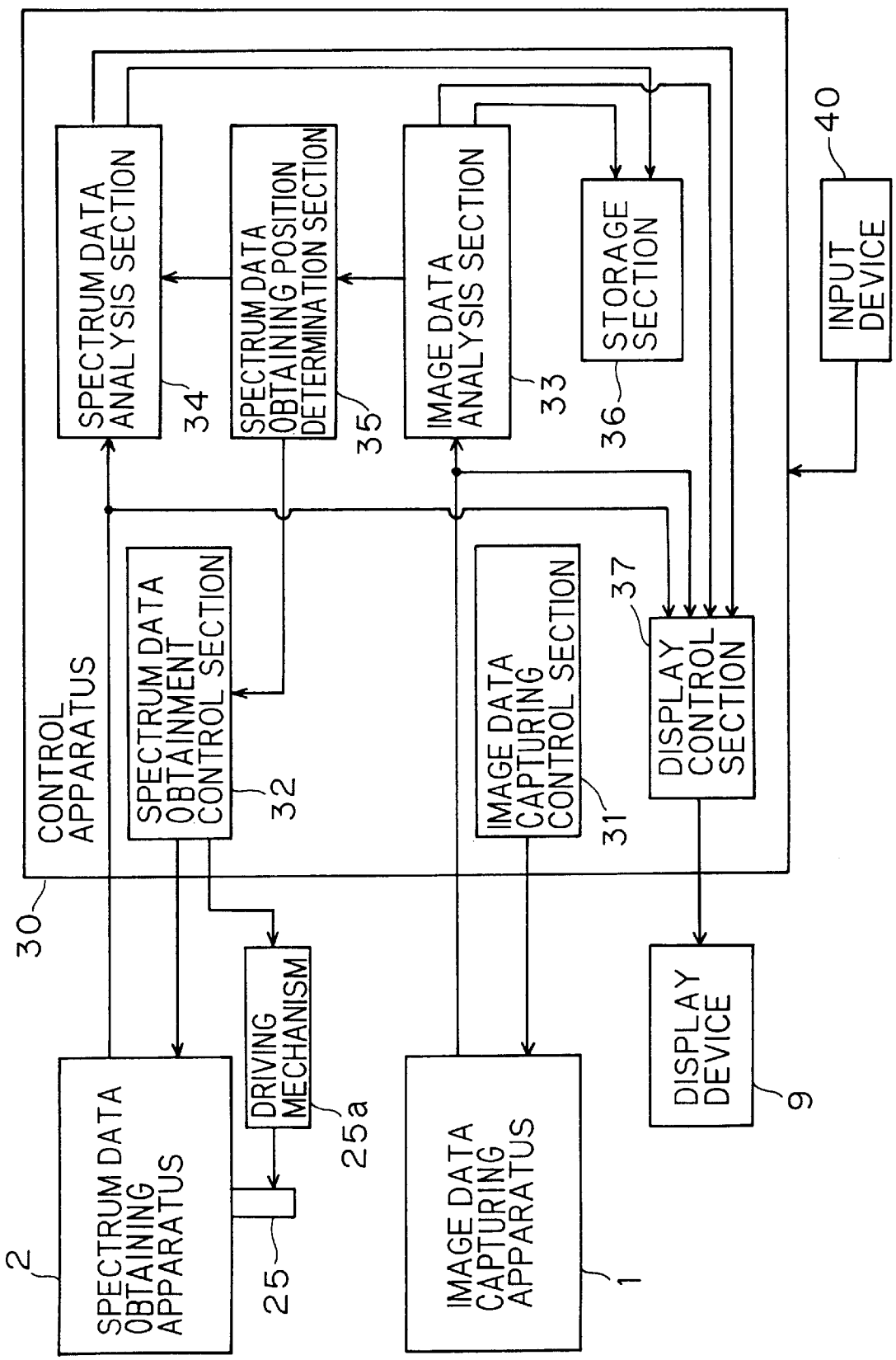

SPECTROSCOPIC IMAGE INPUT SYSTEM

This application is based on applications No. H11-72923 and No. 2000-32750 filed in Japan on Mar. 18, 1999 and Feb. 4, 2000, respectively, the content of which is hereby incorporated by reference.

BACKGROUND OF THE INVENTION

1. Field of the Invention

The present invention relates to a spectroscopic image input system for obtaining the spectrum data of an image of an object.

2. Description of the Prior Art

Acquiring and then analyzing the spectrum data of an object is very effective in obtaining detailed information about the object. On the basis of spectrum data, it is possible to distinguish readily even colors that cannot be distinguished by the naked eye. Accordingly, by obtaining the spectrum data of an object, it is possible to obtain detailed information about the object that helps, for example, to distinguish readily natural and artificial flowers or check how ripe fruit is, which would be impossible through inspection by appearances. Moreover, it is also possible to check unevenness in hues and brightness on liquid crystal displays, or to compare precisely the colors of different inks.

To meet such requirements, in recent years, spectroscopic image input systems for obtaining the spectrum data of an object have been developed with more zeal than ever.

Conventional spectroscopic image input systems include arrangements that obtain the spectrum data of all the pixels of an image at a stroke by the use of an interferometer and arrangements that obtain the spectrum data of the pixels of an image line by line by the use of a spectroscopic prism.

However, arrangements that obtain the spectrum data of all the pixels at a stroke require the use of a high-precision interferometer having an optical-path width corresponding to the size of the image to be processed, and are thus expensive. Moreover, arrangements of this type take much time in data processing because they need to process a large amount of data, and in addition require an expensive means for processing a large amount of data.

On the other hand, arrangements that obtain the spectrum data line by line take much time to obtain data because, to obtain two-dimensional data, they need to scan in a direction perpendicular to the lines, and take much time also in data processing because they need to process a large amount of data resulting therefrom. Moreover, they also require an expensive means for processing a large amount of data.

Separately from these conventional examples, a spectroscopic image input apparatus for obtaining the spectroscopic information of the surface of the moon has been proposed. This apparatus is composed of an imaging portion that conducts surface observation with high spatial resolution and a profiling portion that conducts observation along a given observation line with high wavelength resolution. The imaging portion captures an image, and, for a part of the captured image, the profiling portion obtains spectroscopic data with high wavelength resolution. However, this apparatus is intended for use aboard a satellite, and therefore its imaging portion achieves surface observation by exploiting, as scanning movement, the movement of the satellite relative to the surface of the moon. Thus, it takes much time to obtain the data of a given area.

Accordingly, even if the profiling portion is made to conduct observation of only a desired part of the result of surface observation conducted by the imaging portion so that the result of high-wavelength-resolution observation in a desired position will be obtained as quickly as possible, it takes, after all, much time to obtain the result of high-wavelength-resolution observation in a desired position because it takes much time for the imaging portion to conduct surface observation as described above.

Japanese Laid-Open Patent Application No. H9-178563 (corresponding to U.S. Pat. No. 5,751,420) discloses an apparatus that takes a picture of an object so as to obtain the spectrum data of the object within a small portion in a desired position of the image taken. With this apparatus, it is possible to obtain rough information of an entire object from the image taken and then determine, on the basis of this rough information, in what portion of the image to obtain spectrum data to obtain detailed information. Here, it takes little time to take the picture, and, since spectrum data needs to be obtained only in a desired position, it takes far less time than ever to obtain the spectrum data. Thus, it is possible to obtain detailed information in a very short time. Moreover, since the amount of the spectrum data is small, it is easy to process it.

However, with this apparatus disclosed in the above-mentioned Japanese Laid-Open Patent Application, the user is required, while the image taken is being displayed, to observe the image and determine in what portion thereof to obtain detailed information. Thus, it is impossible to obtain spectrum data without the help of the user. Accordingly, this apparatus is unfit to be used continuously for a long time, and cannot exhibit its ability to the full in cases where there are a large number of target objects and their data needs to be obtained continuously. Moreover, it tends to take much time to determine in what portion of the image to obtain spectrum data.

Moreover, to determine properly where to obtain spectrum data, the user needs to be sufficiently skilled, because an inappropriate determination makes it impossible to obtain useful information from the spectrum data obtained. Acquiring spectrum data in a number of portions will make it possible to obtain useful information, but this increases the time required to obtain the spectrum data, and thus makes it impossible to obtain data in a short time.

Furthermore, in conventional apparatuses, the spectrum data obtained is presented in the form of a graph displayed on a personal computer or the like, and the user is required to analyze the spectrum data by examining the graph displayed. Thus, it takes much time to analyze the spectrum data, and the quality of such analysis tends to vary according to how skilled the user is.

SUMMARY OF THE INVENTION

An object of the present invention is to provide a spectroscopic image input system that has a simple structure but nevertheless permits the spectrum data of an object to be obtained properly and in a short time, and to provide a spectroscopic image input system that analyzes the obtained spectrum data quickly and with stable quality.

To achieve the above object, according to one aspect of the present invention, a spectroscopic image input system is provided with: an image data capturing apparatus for capturing the image data of an object within a predetermined area and with predetermined wavelength resolution by using an image-sensing device; a spectrum data obtaining apparatus for obtaining the spectrum data of the object within a smaller area than the predetermined area in which the image is captured and with higher wavelength resolution than the wavelength resolution of the image data capturing apparatus; and a determination section for determining a portion of the object to obtain the spectrum data by the spectrum data obtaining apparatus on the basis of the image data captured by the image data capturing apparatus.

This system helps capture the image data of an object and also obtain the spectrum data thereof with high wavelength resolution. The image data can be captured by the use of a two-dimensional image-sensing device, and thus doing that takes little time. Moreover, the spectrum data is obtained only within a small area, and thus doing that takes less time and requires only a simple configuration in the spectrum data obtaining apparatus.

The spectrum data is obtained on the basis of the image data. Here, in what portion of the object to obtain spectrum data is determined by the system itself, and thus the user is not required to make such a determination or to be skilled enough to do so. Accordingly, it is possible to determine quickly where to obtain spectrum data and obtain without fail spectrum data that conveys useful information. Furthermore, it is possible to capture the image data and obtain the spectrum data automatically.

According to another aspect of the present invention, a spectroscopic image input system is provided with: an image data capturing apparatus for capturing the image data of an object within a predetermined area and with predetermined wavelength resolution by using an image-sensing device; a spectrum data obtaining apparatus for obtaining the spectrum data of the object within a smaller area than the predetermined area in which the image is captured and with higher wavelength resolution than the wavelength resolution of the image data capturing apparatus; and an analyzer including a first analysis section for analyzing the image data captured by the image data capturing apparatus and a second analysis section for analyzing the spectrum data obtained by the spectrum data obtaining apparatus.

Also this system helps capture the image data of an object and obtain the spectrum data thereof with high wavelength resolution, requiring, just as described above, less time in capturing the image data and obtaining the spectrum data and a simple configuration in the spectrum data obtaining apparatus. Furthermore, analysis of the image data, i.e. extraction of the rough characteristics of the object over a broad area, and analysis of the spectrum data, i.e. extraction of the detailed characteristics of the object within a limited portion thereof, are performed by the system itself, and thus the user is not required to make any determination. Accordingly, it is possible to analyze the object, i.e. extract the characteristics thereof, quickly and with stable quality at all times.

Both of the systems described above may be so designed that at least a part of the wavelength range of the spectrum data obtained by the spectrum data obtaining apparatus lies outside the wavelength range of the image data captured by the image data capturing apparatus. This makes it possible to obtain information that would not be obtained no matter how high the wavelength resolution of the image data may be made. For example, by setting the wavelength range of the image data to be equal to that of visible light and setting the wavelength range of the spectrum data to be equal to that of infrared rays or of visible light plus infrared rays, it is possible to obtain not only information about the appearance of the object but also information that would not been obtained through inspection of the object by appearances.

BRIEF DESCRIPTION OF THE DRAWINGS

This and other objects and features of the present invention will become clear from the following description, taken in conjunction with the preferred embodiments with reference to the accompanying drawings in which:

FIG. 2 is a diagram showing the filter disk provided in the image data capturing apparatus of the above-mentioned spectroscopic image input system;

FIG. 3 is a diagram showing the filter disk provided in the spectrum data obtaining apparatus of the above-mentioned spectroscopic image input system;

FIG. 4 is a sectional view showing the outline of the construction of the interference light forming/sensing section provided in the spectrum data obtaining apparatus of the above-mentioned spectroscopic image input system;

FIG. 5 is a block diagram showing the outline of the configuration of the entire spectroscopic image input system mentioned above;

DESCRIPTION OF THE PREFERRED EMBODIMENTS

Figure 1:
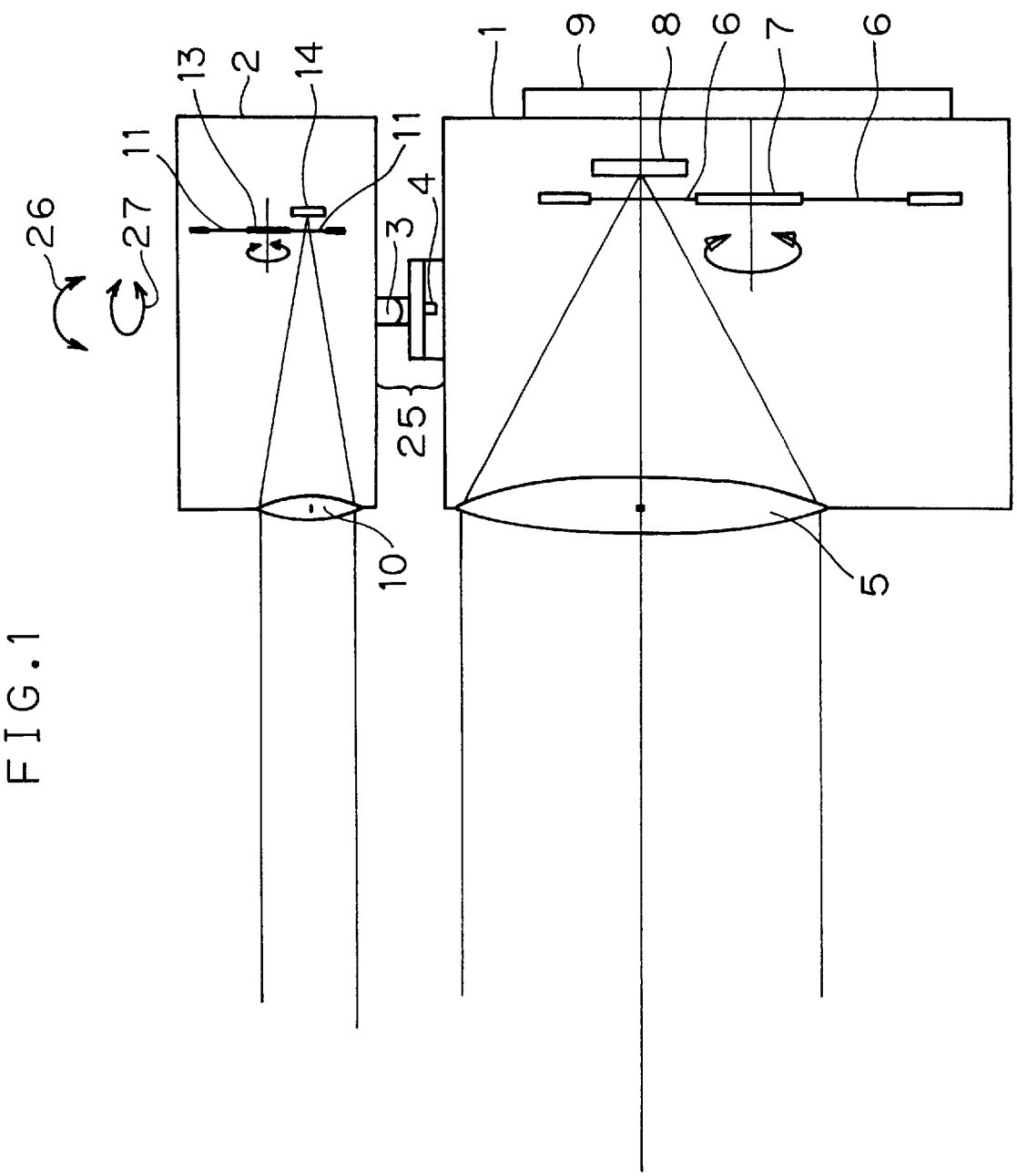
FIG. 1 is a sectional view showing the outline of the construction of the optical system of a spectroscopic image input system embodying the present invention.

Hereinafter, an embodiment of the present invention will be described with reference to the accompanying drawings. FIG. 1 is a sectional view showing the outline of the construction of the entire optical system of a spectroscopic image input system embodying the invention. The spectroscopic image input system of this embodiment is composed of an image data capturing apparatus 1 for capturing and displaying multiple-channel two-dimensional image data and a spectrum data obtaining apparatus 2 for obtaining the spectrum data in a specified position of the image data captured by the image data capturing apparatus 1. Here, as will be described later, a multiple-channel image refers to an image composed of a plurality of spectroscopic images each covering a different wavelength range.

The spectrum data obtaining apparatus 2 is coupled to the image data capturing apparatus 1 through a flexible coupling 25 so as to be rotatable in a pitch direction 26 and in a yaw direction 27. The coupling 25 has a pitch-direction rotary shaft 3 and a yaw-direction rotary shaft 4. The spectrum data obtaining apparatus 2 is driven by a driving mechanism (not shown) to rotate about those two rotary shafts 3 and 4 so as to be able to obtain spectrum data from a desired position of the image data.

In the image data capturing apparatus 1, out of the light coming from an object (not shown), the light having passed through a lens 5 passes through a filter 6 fitted on a filter disk 7 and then focuses on a two-dimensional image-sensing device 8. FIG. 2 shows the filter disk 7 in more detail. As shown in FIG. 2, the filter disk 7 is fitted with a plurality of (in FIG. 2, six) filters 6 having different spectroscopic transmission characteristics. In the image data capturing apparatus 1, by rotating the filter disk 7 and thereby switching the filters 6 through which the light passes, it is possible to obtain the image data of a plurality of spectroscopic images having different wavelength ranges. Here, the wavelength resolution is six at the maximum.

In the spectrum data obtaining apparatus 2, out of the light coming from the object, the light having passed through a lens 10 passes through a filter 11 fitted on a filter disk 13 and then enters a interference light forming/sensing section 14. The optical system of the spectrum data obtaining apparatus 2 including the lens 10 leads the light corresponding to a small area within the image data captured by the image data capturing apparatus 1 (i.e. the light corresponding to a portion of the image data composed of one to several pixels) to the interference light forming/sensing section 14 so as to focus it thereon.

FIG. 3 shows the filter disk 13 in more detail. As shown in FIG. 3, the filter disk 13 is fitted with a plurality of (in FIG. 3, four) filters 11 having different spectroscopic transmittances. By rotating the filter disk 13 and thereby switching the filter 11 that is located in the optical path of the light exiting from the lens 10, it is possible to switch the wavelength range of the light entering the interference light forming/sensing section 14.

The interference light forming/sensing section 14 causes interference of the light having a specific wavelength within the light entering it and senses the resulting interference light. FIG. 4 shows a sectional view showing the outline of the construction of the interference light forming/sensing section 14. The interference light forming/sensing section 14 is provided with a movable flat plate 15 and a stationary flat plate 16 that are arranged parallel to each other. The movable and stationary flat plates 15 and 16 have their mutually facing surfaces 15a and 16a formed into semitransparent mirrors so as to form together a Fabry-Pérot interferometer 30.

In the interference light forming/sensing section 14, the light having entered it through an entrance window 14a then enters the interferometer 30. In the interferometer 30, the light is divided into two beams of light, i.e. a light beam that is transmitted through the two semitransparent surfaces 15a and 16a without being reflected therefrom, and a light beam that is transmitted through the semitransparent surface 15a, is then reflected from the semitransparent surfaces 16a and 15a, and is then transmitted through the semitransparent surface 16a. That is, if it is assumed that the aerial distance between the semitransparent surfaces 15a and 16a equals d, then a difference of $2d$ arises between the optical path lengths of those two light beams. Accordingly, here, interference occurs in the light having a wavelength $\lambda$ that fulfills $2d=m\lambda$ (where m is an integer number). The resulting interference light is, as the most intense light, sensed by a photosensor 17. Thus, the maximum intensity detected by the photosensor 17 corresponds to the intensity of the interference light. Moreover, since the wavelength $\lambda$ of the interference light fulfills $2d=m\lambda$, the wavelength $\lambda$ can be found from the aerial distance d. Hereinafter, the wavelength $\lambda$ of the interference light will be referred to as the transmission intensity peak wavelength.

In the interferometer 30, the aerial distance d is variable, and thus, by varying the aerial distance d, it is possible to detect the intensity of interference light having different wavelengths $\lambda$. The aerial distance d is varied by displacing piezoelectric elements 18 inserted between the two flat plates 15 and 16 and thereby varying the position of the movable flat plate 15 relative to the stationary flat plate 16. Thus, the aerial distance d can be calculated from the voltage applied to the piezoelectric elements 18, provided that the relation between this voltage and the interference wavelength is studied in advance by shining light of known wavelengths into the interferometer. Alternatively, it is also possible to incorporate in the apparatus a distance measurement device for measuring the distance d and measure the distance d directly. In that case, the movable flat plate 15 may be driven by a driving means such as a motor.

Alternatively, it is also possible to use an elastic member that can support the two flat plates 15 and 16 in such a way that they are parallel to each other and the movable flat plate 15 is movable relative to the stationary flat plate 16, and vary the distance between the two flat plates 15 and 16 by controlling the electrostatic force resulting from a voltage applied between them. Also in this case, the distance d is calculated from the voltage applied.

In the spectrum data obtaining apparatus 2, the aerial distance d is varied so as to vary the peak wavelength, and meanwhile, on the basis of the detection result of the photosensor 17, the intensity of the interference light is found at varying peak wavelengths so as to obtain spectrum data, i.e. the relation between the wavelength of the incoming light and its intensity. The spectrum data is obtained with wavelength resolution of a few nanometers at the maximum, and the wavelength resolution can be varied according to applications. Here, the wavelength resolution is sufficiently high relative to the wavelength resolution (for example, six) of the image data capturing apparatus 1 described previously.

For a given value of the aerial distance d, there exist a plurality of wavelengths that fulfill the above-noted relation $2d=m\lambda$. Therefore, if light covering a wide wavelength range is shone into the interference light forming/sensing section 14 at a time, the photosensor 17 detects, as interference light, whatever components of the light are intense irrespective of their wavelengths. This makes it difficult to find what wavelength the detected light has.

To avoid this, in the spectrum data obtaining apparatus 2, the wavelength range of the light entering the interference light forming/sensing section 14 is restricted according to the aerial distance d in such a way that interference is caused in the incoming light at only one wavelength for a given aerial distance d. To achieve this, a plurality of filters 11 having different spectroscopic transmittances are provided, and they are switched in accordance with in which one of predetermined ranges the aerial distance d lies. The number of such ranges for classifying the value of the aerial distance d, i.e. the number of filters 11, and the spectroscopic transmittances of the individual filters 11 are set in consideration of the whole range over which the aerial distance d is varied.

Examples of the peak wavelengths of the light striking the photosensor 17 as observed in a case where spectrum data is obtained in the wavelength range of visible light, i.e. from 400 nm to 750 nm, are listed in Table 1 below. It is to be noted that Table 1 as a whole lists all the peak wavelengths that are observed when the filter 11 is not used, and the portion of Table 1 that is surrounded by bold lines lists the peak wavelengths that are observed when the filter 11 is located in the optical path as in this embodiment.

| Aerial Distance d | Transmission Intensity Peak Wavelength | | | |
|---|---|---|---|---|
| 350 nm | 700 nm | 350 nm | 233 nm | 175 nm |
| 400 nm | 800 nm | 400 nm | 267 nm | 200 nm |
| 450 nm | 900 nm | 450 nm | 300 nm | 225 nm |
| 500 nm | 1000 nm | 500 nm | 333 nm | 250 nm |
| 550 nm | 1100 nm | 550 nm | 367 nm | 275 nm |
| 600 nm | 1200 nm | 600 nm | 400 nm | 300 nm |
| 650 nm | 1300 nm | 650 nm | 433 nm | 325 nm |
| 700 nm | 1400 nm | 700 nm | 467 nm | 350 nm |
| 750 nm | 1500 nm | 750 nm | 500 nm | 375 nm |
| 800 nm | 1600 nm | 800 nm | 533 nm | 400 nm |

In this embodiment, while the aerial distance d of the interferometer 30 is varied from 400 nm to 750 nm, two filters 11 having different spectroscopic transmittances are used. Specifically, when the aerial distance d lies in the range from 400 nm to 550 nm, out of the filters 11 provided, the one that selectively transmits light having wavelengths from 350 nm to 600 nm is located in the optical path; on the other hand, when the aerial distance d lies in the range from 550 nm to 750 nm, out of the filters 11 provided, the one that selectively transmits light having wavelengths from 510 nm to 800 nm is located in the optical path.

As a result, as will be clear from Table 1, for any aerial distance d in the range from 400 nm to 550 nm, and for any aerial distance d in the range from 550 nm to 750 nm, there exists only one peak wavelength that corresponds thereto. Accordingly, as shown in the portion of Table 1 surrounded by bold lines, the interferometer 30 observes only one peak wavelength at any time. This makes it possible to obtain spectrum data over the whole wavelength range of visible light without errors and with ease.

Here, light having a wavelength equal to the aerial distance d is detected by exploiting the interference occurring at m=2, but this does not necessarily have to be so. For example, it is also possible to detect light having a wavelength twice the aerial distance d by exploiting the interference occurring at m=1.

Moreover, although this embodiment deals with a case where spectrum data is obtained in the wavelength range of visible light, the spectrum data that can be obtained by the spectrum data obtaining apparatus 2 is not limited to the wavelength range of visible light. For example, it is also possible to obtain spectrum data in the wavelength range of infrared rays, and thus the filters 11 include one that selectively transmits light having wavelengths in the wavelength range of infrared rays.

The image data captured by the image data capturing apparatus 1 lies within the wavelength range of visible light, and therefore, if the spectrum data obtaining apparatus 2 obtains spectrum data in the wavelength range of infrared rays, a part of the wavelength range of the latter lies outside the wavelength range of the former. This makes it possible to obtain information that would not be obtained from the image data that is captured in the wavelength range of visible light, and thus broadens the applicability of the spectroscopic image input system.

In the spectroscopic image input system of this embodiment, the image data of an object is captured by the image data capturing apparatus 1, and, on the basis of this image data, the system itself determines in what portion of the object to obtain spectrum data by using the spectrum data obtaining apparatus 2. Moreover, the system itself analyzes both the image data, to extract the rough characteristics of the object over a broad area, and the spectrum data, to extract the detailed characteristics of the object within a limited portion thereof. FIG. 5 shows the outline of the configuration of the entire spectroscopic image input system including the control apparatus for performing such operations.

The control apparatus 30 is built by the use of a computer, and is composed of an image data capturing control section 31, a spectrum data obtainment control section 32, an image data analysis section 33, a spectrum data analysis section 34, a spectrum data obtaining position determination section 35, a storage section 36, and a display control section 37. The image data capturing control section 31 controls the capturing of image data by controlling the switching of the filters 6 of the image data capturing apparatus 1 and the exposure of the image-sensing device 8.

The spectrum data obtainment control section 32 controls the obtainment of spectrum data by controlling the orientation of the spectrum data obtaining apparatus 2, the switching of the filters 11, the aerial distance d, the exposure of the photosensor 17, and others. The orientation of the spectrum data obtaining apparatus 2 is set by rotating the coupling 25 through the driving mechanism 25a. The aerial distance d is varied by varying the position of the movable flat plate 15 through the piezoelectric elements 18.

The image data analysis section 33 selects, out of the image data captured by the image data capturing apparatus 1, pixels that exhibit signal intensity above a reference level, and divides the selected pixels into groups according to whether they are contiguous or isolated. The image data analysis section 33 then finds the size of each of those groups (i.e. the number of pixels included therein), the number of groups found, how those groups are distributed, and others, and thereby extracts the characteristics of the object over the entire area in which the image data has been captured.

The image data analysis section 33 performs these operations by using the parameters that are stored therein as parameters that need to be referred to in analysis, such as the number of the channel to be used in selecting pixels out of multiple-channel image data and the reference level of the signal intensity of the pixels. Accordingly, the image data analysis section 33 conducts analysis with uniform quality, and thus it is possible to obtain the characteristics of the object as objective data. The image data captured and the results of analysis thereof are stored in the storage section 36.

The spectrum data analysis section 34 finds, on the basis of the spectrum data obtained by the spectrum data obtaining apparatus 2, the maximum intensity, the wavelength of the maximum intensity, the intensity ratios of one or more wavelengths relative to another, and others, and thereby extracts the spectroscopic characteristics of the object within the portion thereof in which the spectrum data has been obtained. In cases where spectrum data has been obtained in more than one portion, the spectrum data analysis section 34 finds also statistical values such as the average and the dispersion, among those portions, of the intensity ratios of one or more wavelengths relative to another.

Also the spectrum data analysis section 34 performs these operations by using the parameters that are stored therein as parameters that need to be referred to in analysis, such as the wavelengths at which to find the relative intensity. Accordingly, also the spectrum data analysis section 34 conducts analysis with uniform quality, and thus it is possible to obtain the characteristics of the object as objective data. The spectrum data obtained and the results of analysis thereof are stored in the storage section 36.

The spectrum data obtaining position determination section 35 determines where to obtain spectrum data on the basis of the results of analysis conducted by the image data analysis section 33. Specifically, it determines to obtain spectrum data in the central portions of the individual groups found by the image data analysis section 33. Here, no limit is set on the number of portions in which to obtain the spectrum data. However, an upper limit may be set on this number to permit the spectrum data of a given object to be obtained within a predetermined time. It is to be noted that the image data analysis section 33 may be so configured as to find the pixel that exhibits the maximum intensity even when there is no pixel that exhibits signal intensity above the reference level mentioned previously, i.e. even when the number of groups found is zero. This makes it possible to determine at least one portion in which to obtain spectrum data with any object processed.

The coordinates, on the image data, of the portion or portions determined by the spectrum data obtaining position determination section 35 are fed to the spectrum data obtainment control section 32 so as to be used to control the orientation of the spectrum data obtaining apparatus 2, and are fed also to the spectrum data analysis section 34 so as to be added to the spectrum data that is to be stored.

The storage section 36 stores the image data, the spectrum data, and the results of analyses on a recording medium such as an optical disk. The user of the system can retrieve and use the thus stored data at any time.

Figure 6:
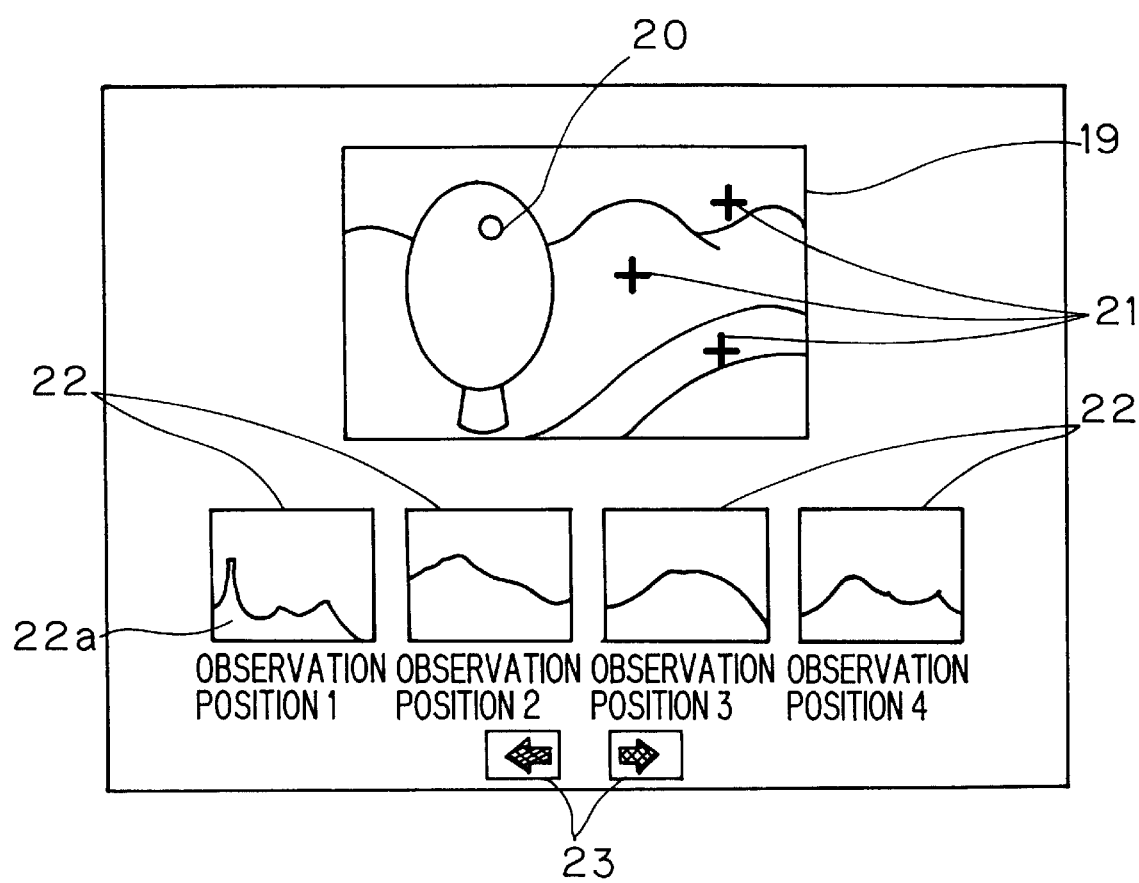
FIG. 6 is a diagram showing an example of the screen displayed in the above-mentioned spectroscopic image input system.

The image represented by the image data captured, the portion or portions in which the spectrum data has been obtained, the spectrum or spectra represented by the spectrum data obtained, and the results of analyses of the image data and the spectrum data are also displayed on a display device 9. The display here is controlled by the display control section 37. FIG. 6 shows an example of the display of the image, the portions in which the spectrum data has been obtained, and the spectra.

The display device 9 presents, on a single screen, a two-dimensional color image 19 obtained by superimposing the multiple-channel image data captured, circle- and cross-shaped marks 20 and 21 indicating the portions in which the spectrum data obtaining position determination section 35 has determined to obtain spectrum data, and the spectra 22a represented by the spectrum data obtained individually in those portions. A circle-shaped mark 20 indicates a portion in which spectrum data is currently being obtained, and a cross-shaped mark 21 indicates a portion in which spectrum data has already been obtained.

On the screen, the spectra 22a are shown in a plurality of (in FIG. 6, four) spectrum view windows 22 in order of recency from the left. On the screen are displayed also arrows 23, which are used, when the spectrum data has been obtained in more portions than the number of spectra that can be displayed at a time, to shift one by one the spectra that appear in the individual windows 22.

By viewing what is displayed on the display device 9, the user of the system can confirm the operation that the spectroscopic image input system is currently performing. It is to be noted that, although no illustration is given, the results of analyses of the image data and the spectrum data are presented in the form of values and graphs on another screen.

Figure 7:
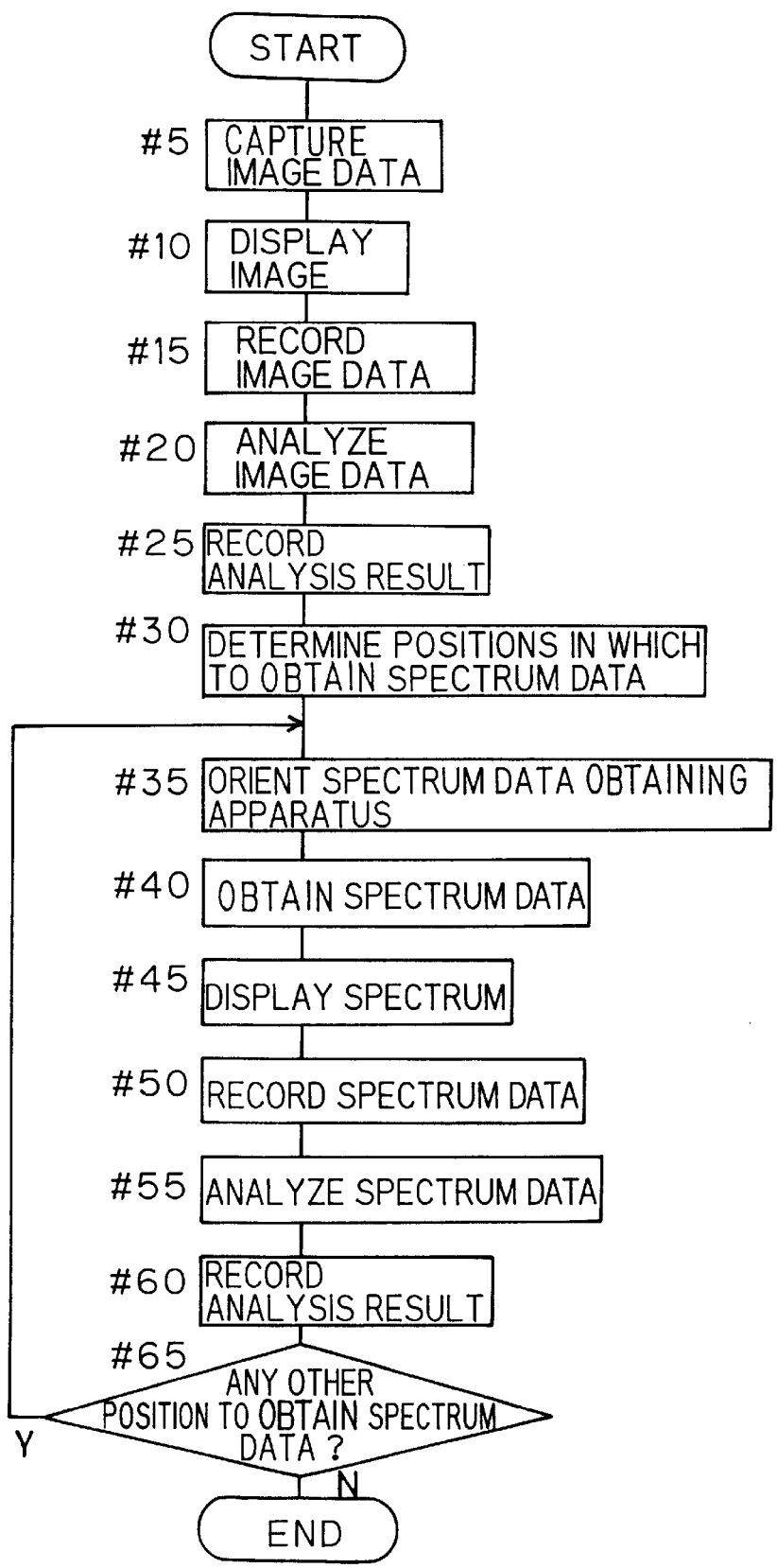
FIG. 7 is a flow chart showing how the above-mentioned spectroscopic image input system operates.

FIG. 7 shows the outline of the flow of operations performed in the spectroscopic image input system of this embodiment configured as described above. First, the image data of an object is captured (step #5), and then the image represented by the captured image data is displayed (#10) and simultaneously the image data is recorded (#15). Next, the image data is analyzed (#20), and the result of analysis is recorded (#25). Moreover, on the basis of the result of analysis of the image data, in what portion or portions of the object to obtain spectrum data is determined (#30).

Next, the spectrum data obtaining apparatus 2 is oriented so as to point at one of the thus determined portions of the object in which to obtain spectrum data (#35), and then the spectrum data of the object is obtained in that portion (#40). Then, the spectrum represented by the obtained spectrum data is displayed (#45), and the spectrum data is recorded (#50). Moreover, the spectrum data is analyzed (#55), and the result of analysis thereof is recorded (#60).

Thereafter, whether spectrum data has already been obtained in all of the determined portions or not is checked (#65). If there remains any portion in which spectrum data has not yet been obtained, then the operation flow returns to step #35 to repeat the operations related to spectrum data from step #35 through step #60; if there remains no portion in which spectrum data has not yet been obtained, then the processing of this object is finished.

The spectroscopic image input system of this embodiment, operating as described above, can perform automatically all of its operations, i.e. from capturing of image data to analysis of spectrum data. Accordingly, simply by providing the spectroscopic image input system further with a mechanism that automatically catches an object in a position in which it faces the image data capturing apparatus 1, it is possible to process a number of objects continuously without the help of the user.

In the spectroscopic image input system of this embodiment, the user of the system is allowed to determine in what portions of an object to obtain spectrum data, analyze the captured image data, and analyze the obtained spectrum data. As shown in FIG. 5, the control apparatus 30 has an input device 40 connected thereto, and the user can feed commands to the control apparatus 30 using a mouse, a keyboard, and others included in the input device 40.

The user can determine in what portions of an object to obtain spectrum data by using the mouse. In that case, a circle-shaped mark 20 that is displayed on the display device 9 together with the image serves as a cursor that moves just as the mouse is moved. Thus, the user can specify a portion in which to obtain spectrum data by moving the cursor to a desired position and then pressing a button.

The user can analyze image data and spectrum data by performing input operations from the keyboard. For example, the user enters, when analyzing image data, the channel number of the image data and the reference level of the signal intensity to be used in analysis, and, when analyzing spectrum data, two or more wavelengths at which to find the relative intensity. Here, the necessary calculations themselves are performed by the analysis sections 33 and 34, and thus the user is required only to perform input operations.

In this way, the determination of in what portions of an object to obtain spectrum data and the analysis of the obtained data can be conducted either by the system itself or by the user. This makes it possible, on the one hand, to enhance processing efficiency by automating the processing of standardized objects and, on the other hand, to rely on the user's skill when processing extraordinary objects with which appropriate information cannot be obtained through standardized processing.

As described above, overall information about an object is obtained from the image data thereof, and detailed information of the object is obtained, only within a desired portion or portions thereof, from the spectrum data thereof that is obtained with higher wavelength resolution than the image data. In this embodiment, spectrum data is obtained only within part of the image data of an object, and therefore, as compared with cases where spectrum data is obtained from the entire image, it is possible to obtain desired spectrum data in a shorter time.

Hereinafter, some examples will be given as to how the spectroscopic image input system of this embodiment is used in practical applications. In the examples described below, the sizes of target objects differ greatly from one example to another. This, however, can be coped with by designing the optical systems of the image data capturing apparatus 1 and the spectrum data obtaining apparatus 2 to suit the target objects, and thus there is no need to modify the overall configuration of the system itself.

In a first example, the target objects are plants bearing fruit. Here, the image data of a plant provides information about the growth of the fruit it bears, such as the number and sizes of pieces of the fruit, and the spectrum data obtained in the positions where the plant has the fruit provides how ripe the fruit is. Suppose, for example, tomato plants are targeted. First, the image data of an entire tomato plant is captured.

In analyzing the image data, the image data of the red-color channel is used, and, out of this image data, pixels that exhibit signal intensity above a reference level are selected as pixels corresponding to the fruit. The selected pixels are then classified into groups according to whether they are contiguous or isolated, and then the number of groups thus found and the number of pixels included in each of those groups are calculated as indices that indicate the growth of the fruit. Moreover, the yield, grade of quality, unevenness in quality, and other parameters as expected on the basis of the values thus calculated are evaluated as part of the result of analysis.

Spectrum data is obtained in the central portions of the individual groups. In cases where there are too many groups, part of the groups are selected in such a way that the portions in which spectrum data will actually be obtained are distributed substantially evenly.

The spectrum data is obtained in the wavelength range from 700 nm to 1000 nm. This is because the reflection spectrum from a ripe tomato exhibits high intensity throughout this wavelength range. In this case, part of the wavelength range of the spectrum data lies outside the wavelength range of the image data.

In analyzing the spectrum data, the maximum intensity is found so as to be used as an index indicating the ripeness of the fruit. Moreover, the number of days that are expected to be required for a predetermined proportion of the fruit to ripen is evaluated as part of the result of analysis.

In a second example, the target objects are cultivation fields, woods or forests, grasslands or meadows, water surfaces, or the like, and information about the growth of plants, damage caused by vermin, pollution of lakes or marshes is obtained. Here, image data provides information about the distribution of plants and the damage caused thereto by vermin or disease germs, or the extent of the pollution of lakes or marshes; on the other hand, spectrum data provides information about the growth of the plants and the degree of the damage caused thereto by the vermin or disease germs, or the degree of the pollution of the lakes or marshes. The analysis of data and the determination of where to obtain spectrum data are processed in much the same manner as in the first example.

In a third example, the target objects are the faces of people, and information that helps monitor their health is obtained. In the analysis of image data, individual parts of the face of a person, such as the forehead, nose, chin, and cheeks, are located and whether or not there is any part whose color is different from the color it has in healthy condition is checked. If some abnormality is found in any of those parts, the extent of the abnormality is also found. When some abnormality is found, the part in which the abnormality is found is determined as the portion in which to obtain spectrum data, and, in that portion, spectrum data is obtained within a wavelength range around 430 nm as reflecting the amount of blood flowing beneath the skin. Then, in the analysis of the spectrum data thus obtained, the maximum intensity is found as indicating the degree of blood congestion or ischemia (blood deficiency).

Even if no remarkable abnormality is found, predetermined parts of the face, such as the forehead and cheeks, are determined as the portions in which to obtain spectrum data, and, in those portions, spectrum data is obtained in the above-mentioned wavelength range around 430 nm and also in a wavelength range around 1900 nm as representing the amount of perspiration. Then, in the analysis of the spectrum data thus obtained, the maximum intensity is found in each of those two wavelength ranges as indicating the degrees of blood circulation and of perspiration, respectively. Also in this case, part of the wavelength range of the spectrum data lies outside the wavelength range of the image data.

In a fourth example, DNA is analyzed by the FISH (fluorescent in situ hybridization) method. Here, the target object is DNA hybridized with several types of probe DNA labeled with fluorescent markers emitting fluorescence at different wavelengths. First, the image data of the hybridized DNA is captured, and then the captured image data is analyzed to find out the portions thereof that are emitting fluorescence. Next, using the portions that are emitting fluorescence as portions in which to obtain spectrum data, spectrum data is obtained in a wavelength range including the wavelengths of all of the fluorescent markers. Then, the obtained spectrum data is analyzed to identify, on the basis of the intensity of different wavelengths relative to each other and the wavelength of the maximum intensity, the fluorescent markers that are emitting fluorescence. This makes it possible to judge with which types of probe DNA the target DNA has been hybridized and determine the base sequences of the hybridized portions thereof and the position of a gene.

It is to be understood that a spectroscopic image input system according to the present invention may be configured in any other manner than is described above. Hereinafter, examples of alternative configurations that can be substituted for that of the spectroscopic image input system of the embodiment described above will be described.

The image data capturing apparatus 1 may be configured in any manner as long as it can capture image data by the use of a two-dimensional image-sensing device; for example, it may be so configured that the incoming light is separated into light components of a plurality of wavelength ranges by a dichroic prism and image data is captured individually by two-dimensional image-sensing devices provided one for each of those wavelength ranges. However, image data does not necessarily have to be captured as image data composed of components of a plurality of different wavelength ranges;

for example, it is also possible to focus the incoming light intact on a two-dimensional image-sensing device and thereby capture binary image data.

The spectrum data obtaining apparatus 2 does not necessarily have to employ a Fabry-Pérot interferometer 30; for example, it may employ instead a Michelson or Sagnac interferometer. Alternatively, it is also possible to use a spectroscopic prism, diffraction grating, or the like instead of an interferometer.

The display device 9 does not necessarily have to be disposed at the back of the image data capturing apparatus 1; instead, it may be disposed somewhere around the control apparatus 30.

Obviously, many modifications and variations of the present invention are possible in light of the above teachings. It is therefore to be understood that within the scope of the appended claims, the invention may be practiced other than as specifically described.

What is claimed is:

1. A spectroscopic image input system comprising:
    an image data capturing apparatus for capturing image data of an object within a predetermined area and with predetermined wavelength resolution by using an image-sensing device;
    a spectrum data obtaining apparatus for obtaining spectrum data of the object within a smaller area than the predetermined area in which the image is captured and with higher wavelength resolution than the wavelength resolution of the image data capturing apparatus; and
    a determination section for determining a portion of the object to obtain the spectrum data by the spectrum data obtaining apparatus on a basis of the image data captured by the image data capturing apparatus.

2. A spectroscopic image input system as claimed in claim 1, further comprising:
    a control section for instructing the spectrum data obtaining apparatus to obtain spectrum data of the portion determined by the determination section.

3. A spectroscopic image input system as claimed in claim 1,
    wherein at least a part of a wavelength range of the spectrum data obtained by the spectrum data obtaining apparatus lies outside a wavelength range of the image data captured by the image data capturing apparatus.

4. A spectroscopic image input system as claimed in claim 1, further comprising:
    a coupling which rotatably couples the image data capturing apparatus and the spectrum data obtaining apparatus.

5. A spectroscopic image input system as claimed in claim 1, wherein the image data capturing apparatus comprises a first lens, and the spectrum data obtaining apparatus comprises a second lens.

6. A spectroscopic image input system as claimed in claim 5, wherein the image data capturing apparatus further comprises a first filter disk, and the spectrum data obtaining apparatus further comprises a second filter disk.

7. A spectroscopic image input system as claimed in claim 1, wherein the spectrum data obtaining apparatus obtains spectrum data of the object using light coming from the object.

8. A spectroscopic image input system comprising:
    an image data capturing apparatus for capturing image data of an object within a predetermined area and with predetermined wavelength resolution by using an image-sensing device;
    a spectrum data obtaining apparatus for obtaining spectrum data of the object within a smaller area than the predetermined area in which the image is captured and with higher wavelength resolution than the wavelength resolution of the image data capturing apparatus; and
    an analyzer including:
        a first analysis section for analyzing the image data captured by the image data capturing apparatus; and
        a second analysis section for analyzing the spectrum data obtained by the spectrum data obtaining apparatus.

9. A spectroscopic image input system as claimed in claim 8, further comprising:
    a determination section for determining a portion of the object to obtain the spectrum data by the spectrum data obtaining apparatus on a basis of result of analysis performed by the first analysis section.

10. A spectroscopic image input system as claimed in claim 8,
    wherein at least a part of a wavelength range of the spectrum data obtained by the spectrum data obtaining apparatus lies outside a wavelength range of the image data captured by the image data capturing apparatus.

11. A spectroscopic image input system as claimed in claim 8, further comprising:
    a coupling which rotatably couples the image data capturing apparatus and the spectrum data obtaining apparatus.

12. A spectroscopic image input system as claimed in claim 8, wherein the image data capturing apparatus comprises a first lens, and the spectrum data obtaining apparatus comprises a second lens.

13. A spectroscopic image input system as claimed in claim 12, wherein the image data capturing apparatus further comprises a first filter disk, and the spectrum data obtaining apparatus further comprises a second filter disk.

14. A spectroscopic image input system as claimed in claim 8, wherein the spectrum data obtaining apparatus obtains spectrum data of the object using light coming from the object.

15. A method of conducting spectroscopic measurement in a spectroscopic measurement apparatus, comprising:
    capturing, with a predetermined wavelength resolution, image data of an object;
    analyzing the image data thus captured; and
    obtaining, with a higher wavelength resolution than the predetermined wavelength resolution, spectrum data within a particular area of the object in accordance with result of the analysis.

16. A method of conducting spectroscopic measurement as claimed in claim 15,
    wherein the analysis of the image data is achieved by classifying the image data into groups of image data.

17. A method of conducting spectroscopic measurement as claimed in claim 15, wherein the spectrum data is obtained from light coming from the object.

18. A method of conducting spectroscopic measurement as claimed in claim 15, wherein the image data is captured via a first lens, and the spectrum data is obtained via a second lens.

19. A method of conducting spectroscopic measurement as claimed in claim 15, wherein the captured image data is within a predetermined area, and the particular area is a smaller area than the predetermined area.

* * * * *